B. CARLISLE.
SEARCHLIGHT FOR MOTOR VEHICLES.
APPLICATION FILED JUNE 24, 1920.
1,380,313.
Patented May 31, 1921.
2 SHEETS—SHEET 1.
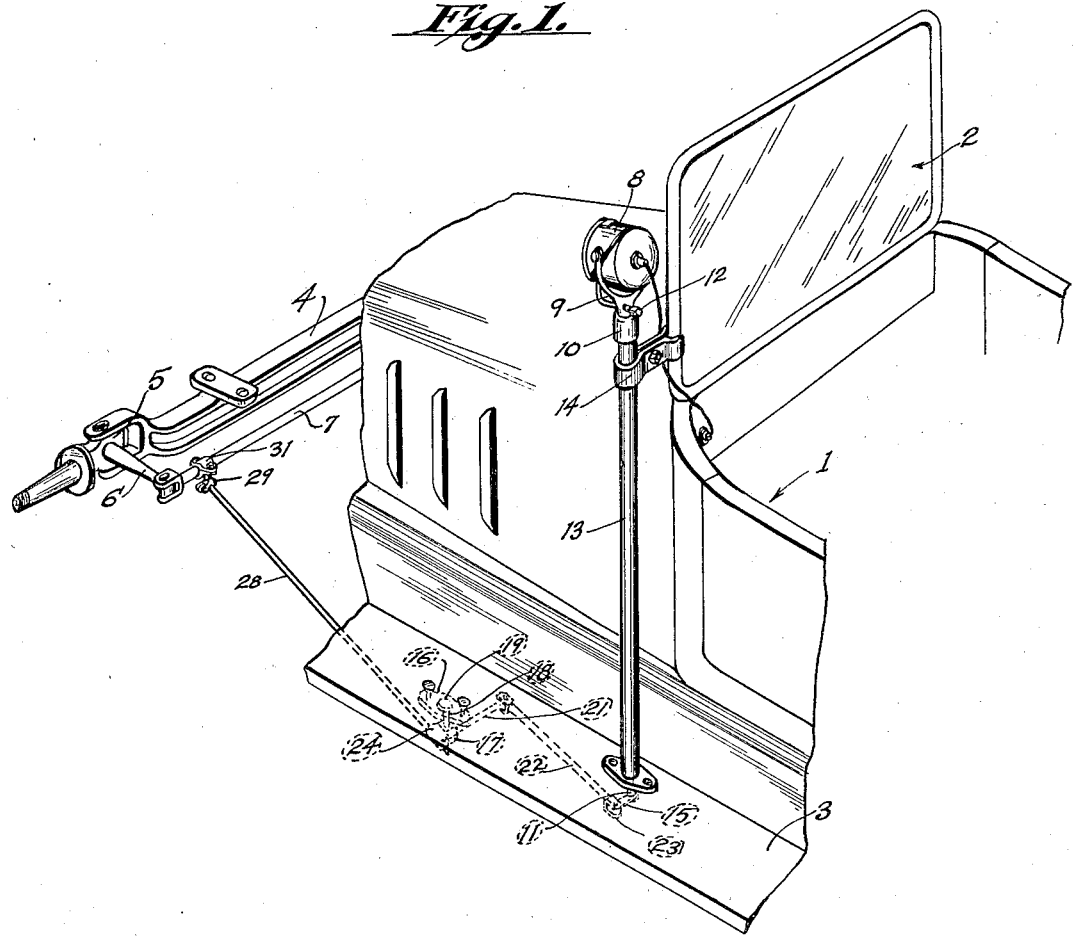
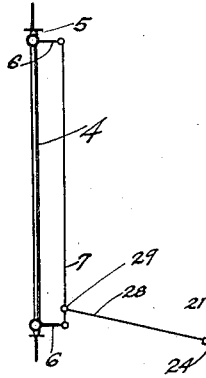
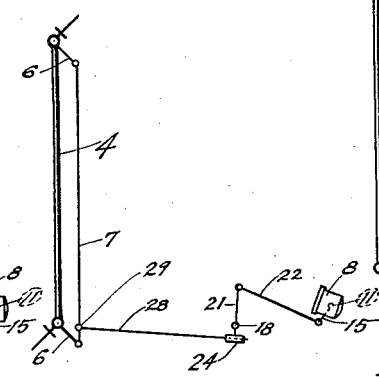
INVENTOR
BERT CARLISLE.
BY Hazard & Miller
ATTORNEYS B. CARLISLE.
SEARCHLIGHT FOR MOTOR VEHICLES.
APPLICATION FILED JUNE 24, 1920.
1,380,313.
Patented May 31, 1921.
2 SHEETS—SHEET 2.
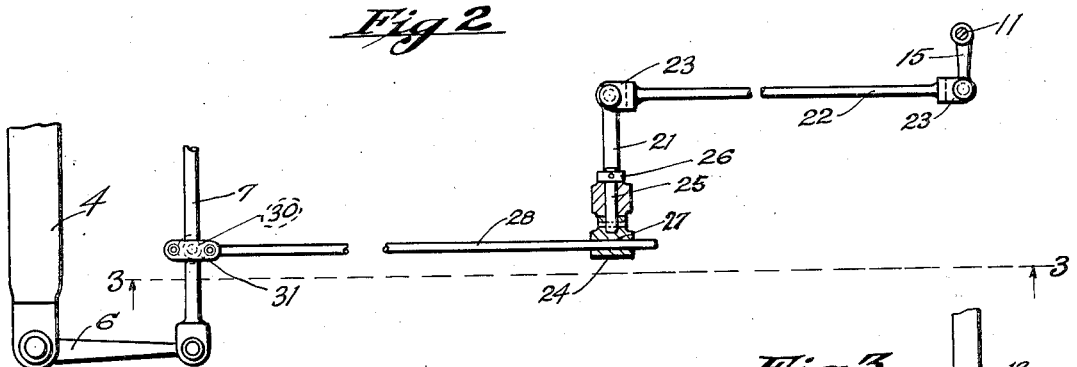
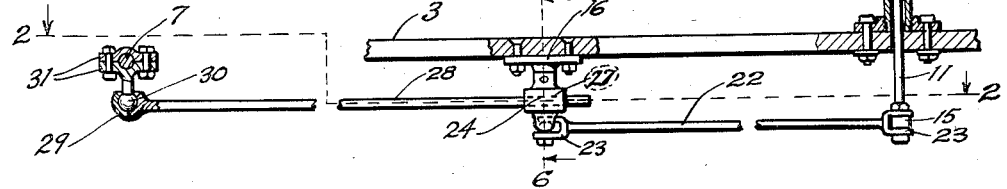
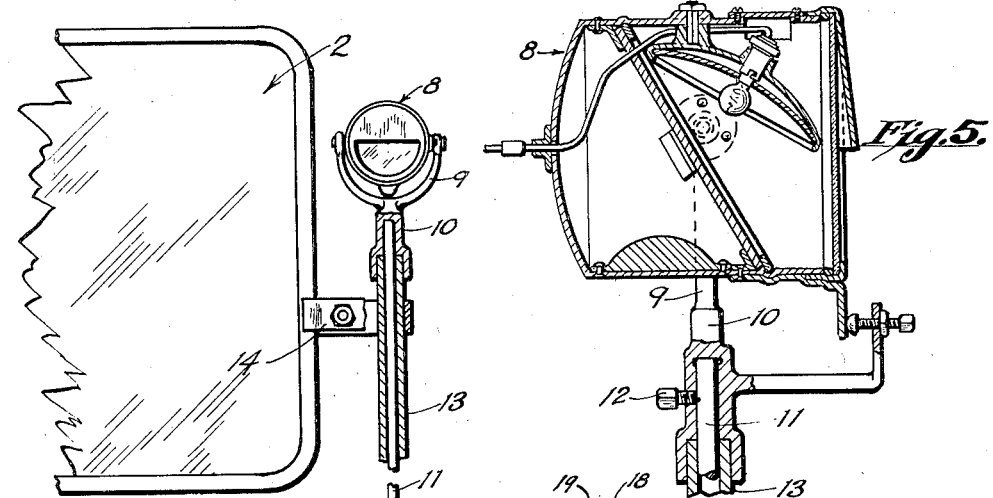
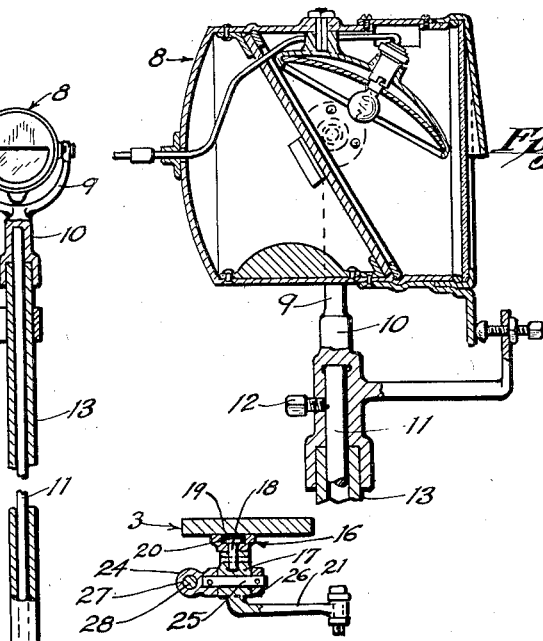
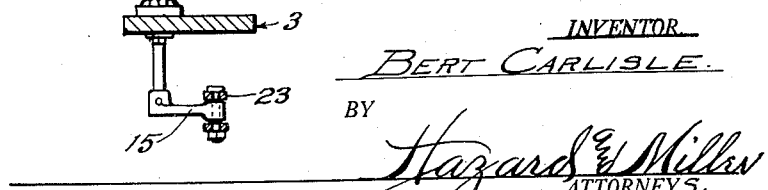
INVENTOR
BERT CARLISLE.
BY
Hazard & Miller
ATTORNEYS.

UNITED STATES PATENT OFFICE.

BERT CARLISLE, OF SANTA ANA, CALIFORNIA.

SEARCHLIGHT FOR MOTOR-VEHICLES.

1,380,313.  Specification of Letters Patent.  Patented May 31, 1921.

Application filed June 24, 1920. Serial No. 391,369.

*To all whom it may concern:*

Be it known that I, BERT CARLISLE, a citizen of the United States, residing at Santa Ana, in the county of Orange and State of California, have invented new and useful Improvements in Searchlights for Motor-Vehicles, of which the following is a specification.

This invention relates to search lights for motor vehicles and the like, and has for its object the provision of a search light arranged to be mounted at one side of the vehicle in such manner that the search light will be turned as the vehicle turns so as to throw the rays of light from the search light on to the road ahead of the vehicle.

The invention will be readily understood from the following description of the accompanying drawings, in which—

Figure 1 is a perspective view of a portion of a motor vehicle showing the improved search light mounted thereon.

Fig. 2 is a view of the actuating mechanism for the search light taken on the line 2—2 of Fig. 3.

Fig. 3 is a side elevation of the actuating mechanism taken on the line 3—3 of Fig. 2.

Fig. 4 is a longitudinal section through the supporting upright for the search light showing its connection with the motor vehicle.

Fig. 5 is a longitudinal section through the search light.

Fig. 6 is a transverse section on the line 6—6 of Fig. 3.

Figs. 7, 8 and 9 are diagrammatic illustrations of the actuating mechanism for the search light showing the position of the latter as the wheels of the vehicle are straight ahead, or turned to the right or left.

In the present embodiment of the invention a motor vehicle is shown at 1 having the usual windshield 2 and a running board 3. The front axle of the vehicle is shown at 4 provided with the usual steering knuckles 5 from which project the steering levers 6. The usual cross connecting rod 7 connects the levers 6 and is actuated in usual manner by the steering wheel for shifting the steering knuckles from the position shown in Fig. 7 to either of the positions shown in Fig. 8 or Fig. 9 for causing turning of the vehicle to the right or left.

The search light mounted upon the vehicle is shown at 8 as mounted in a yoke 9 forming a sleeve 10 arranged to be received over the end of a supporting rod 11. The sleeve 10 is, preferably, fixed relative to the supporting rod by means of the set screw 12. The supporting rod 11 is received within a hollow standard 13 extending upwardly from the running board 3 alongside the body of the vehicle and, preferably, adjacent the windshield 2. A clamping bracket 14 may be received around standard 13 and clamped to one of the side uprights of the windshield in order to rigidly position the standard 13. The supporting rod for the search light extends downwardly through standard 13 and through the running board and is provided at its lower end with a laterally projecting arm 15 fixed to supporting rod 11 so that turning of said arm will rotate the supporting rod in standard 13 and as a consequence turn the search light 8 upon a vertical pivot.

The movement of connecting rod 7 turning the wheels of the vehicle to either the right or left is adapted to turn arm 15 in opposite directions for similarly turning search light 8 to either the right or left. As an instance of this arrangement a bracket 16 may be bolted to the under side of running board 3 between connecting rod 7 and the arm 15, and a bearing 17 may be vertically pivoted to this bracket by means of a pin 18 fixed in said bearing and extending upwardly therefrom with the enlarged head 19 of said pin received in a recess 20 provided in bracket 16 so that the pin and bearing may be rotated relative to said bracket. The bearing 17 is provided with a laterally projecting arm 21 normally substantially parallel to arm 15, and a link 22 is connected at its respective ends to arms 15 and 22 as by the yokes 23 pivoted to the respective arms.

A guideway 24 is horizontally pivoted relative to bearing 17 as by a pin 25 projecting from the said bearing and rotatably held therein as by a head 26 fixed upon said pin. The end of pin 25 is fixed within the guideway 24, and said guideway is provided with a longitudinal aperture 27 through which is slidably received a link 28, the outer end of which is connected to connecting rod 7. This latter connection is, preferably, a universal joint comprising a socket 29 upon the end of link 28 and in which is received a ball 30 suspended from clamping members 31 clamped around the connecting rod 7.

The parts are so arranged that when connecting rod 7 is shifted, as shown in Figs. 8 and 9, bearing 17 and guideway 24 will be turned upon pin 18 to swing arm 21 either forwardly or rearwardly, the link 28 freely sliding through guideway 24 compensating for the variations in the distance between connecting rod 7 and said guideway.

The turning of arm 21, as thus described, will cause corresponding opposite turning of arm 15, as clearly shown in Figs. 8 and 9, for turning supporting rod 11 and thus swinging the search light 8 to one side or the other. Thus it will be seen that as the wheels of the vehicle are turned to cause the vehicle to travel in a curved path the search light 8 will be similarly turned to cause the rays of light therefrom to follow the curved path over which the vehicle is traveling. The road shocks and vibrations transmitted to the connecting rod 7 are prevented from being transmitted to the supporting rod of the search light by the universal joint formed between the connecting rod 7 and link 28 and also by means of the pivotal arrangement of guideway 24 relative to bearing 17.

Various changes may be made without departing from the spirit of the invention as claimed.

What is claimed is:

1. The combination with a connecting rod for the steering knuckles of a motor vehicle, of a rotatable supporting rod, a searchlight upon said rod, a pivoted bearing, arms extending from said bearing and said supporting rod, a link connecting said arms, and a connection between said connecting rod and said bearing for turning the latter with the movement of said connecting rod.

2. The combination with a connecting rod for the steering knuckles of a motor vehicle, of a rotatable supporting rod, a searchlight upon said rod, a bracket, a bearing pivoted to said bracket, arms extending from said bearing and said supporting rod, a link connecting said arms, a guideway pivoted to said bearing, and a link connected to said connecting rod and slidable through said guideway.

In testimony whereof I have signed my name to this specification.

BERT CARLISLE.